US008472962B2

(12) United States Patent
Kim et al.

(10) Patent No.: US 8,472,962 B2
(45) Date of Patent: Jun. 25, 2013

(54) APPARATUS AND METHOD FOR INTERFERENCE MITIGATION IN A WIRELESS COMMUNICATION SYSTEM

(75) Inventors: Il-Whan Kim, Incheon (KR); Sang-Boh Yun, Seongnam-si (KR); Sung-Soo Hwang, Yongin-si (KR); Dae-Sik Hong, Seoul (KR); Sung-Soo Park, Yongin-si (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 481 days.

(21) Appl. No.: 12/766,288

(22) Filed: Apr. 23, 2010

(65) Prior Publication Data
US 2010/0273498 A1 Oct. 28, 2010

(30) Foreign Application Priority Data
Apr. 23, 2009 (KR) .................. 10-2009-0035340

(51) Int. Cl.
H04W 36/00 (2009.01)
H04W 72/00 (2009.01)
H04W 4/00 (2009.01)

(52) U.S. Cl.
USPC ......... 455/444; 455/452.2; 370/338; 370/332

(58) Field of Classification Search
USPC .............. 370/328–332, 335–339, 342–347; 455/422–425, 436–439, 442–448
See application file for complete search history.

(56) References Cited

U.S. PATENT DOCUMENTS 7,061,891 B1 * 6/2006 Kilfoyle et al. ............... 370/335
2002/0093926 A1 * 7/2002 Kilfoyle ........................ 370/335
2008/0108363 A1 5/2008 Yu et al.
2008/0227422 A1 9/2008 Hwang et al.
2009/0029645 A1 * 1/2009 Leroudier ....................... 455/7
2009/0191888 A1 * 7/2009 Abedi ........................ 455/450
2009/0312017 A1 * 12/2009 Grob et al. .................. 455/434
2010/0008295 A1 * 1/2010 Ji et al. ........................ 370/328
2010/0104033 A1 * 4/2010 Gorokhov .................... 375/260
2010/0238885 A1 * 9/2010 Borran et al. ................ 370/329
2010/0246544 A1 * 9/2010 Brisebois et al. ............ 370/338
2011/0128916 A1 * 6/2011 Kwon et al. .................. 370/328
2011/0165871 A1 * 7/2011 Juergen et al. ............... 455/424
2012/0076027 A1 * 3/2012 Akyildiz et al. ............. 370/252
2012/0157108 A1 * 6/2012 Boudreau et al. ........... 455/450
2012/0238268 A1 * 9/2012 Radulescu et al. ......... 455/435.1

OTHER PUBLICATIONS

Kim, Tae-Hwan, and Tae-Jin Lee. "Throughput enhancement of macro and femto networks by frequency reuse and pilot sensing." Performance, Computing and Communications Conference, 2008. IPCCC 2008. IEEE International. IEEE, 2008.*

* cited by examiner

*Primary Examiner* — Thai Hoang
(74) *Attorney, Agent, or Firm* — Jefferson IP Law, LLP

(57) ABSTRACT

An apparatus and method for mitigating inter-cell interference in a macro Base Station (BS) of a wireless communication system having at least one femto cell are provided. The method includes restricting the use of at least one code among at least one available code when forming a beam by resource block, constructing a codebook set for each resource block, when feedback information is received from at least one Mobile Station (MS), allocating a resource to the MS in consideration of the feedback information, determining a weight for forming a beam to the MS in consideration of the codebook set for each resource block and the resource allocated to the MS, and forming the beam to the MS using the weight.

18 Claims, 12 Drawing Sheets

US 8,472,962 B2

APPARATUS AND METHOD FOR INTERFERENCE MITIGATION IN A WIRELESS COMMUNICATION SYSTEM

PRIORITY

This application claims the benefit under 35 U.S.C. §119(a) of a Korean patent application filed in the Korean Intellectual Property Office on Apr. 23, 2009 and assigned Serial No. 10-2009-0035340, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) Samsung Electronics Co., Ltd., and 2) Industry-Academic Cooperation Foundation, Yonsei University.

BACKGROUND OF THE INVENTION

1. Field of the Invention

The present invention relates to an apparatus and method for mitigating inter-cell interference in a wireless communication system. More particularly, the present invention relates to an apparatus and method for mitigating inter-cell interference in a wireless communication system, which uses a femto Base Station (BS).

2. Description of the Related Art

In cellular wireless communication systems, Mobile Stations (MSs) positioned at cell edges fall under interference from adjacent cells. In recent years, attention is being paid to an inter-cell interference mitigation technique that makes use of limited coordination. For example, the inter-cell interference mitigation technique includes a Collision Avoidance-Beam Forming (CA-BF) technique and a Precoding Matrix Index (PMI) coordination technique.

Regarding the CA-BF technique, a master scheduler schedules BSs inducing inter-cell interference such that the inter-cell interference is minimized. That is, the master scheduler performs scheduling such that a sum capacity is maximized using PMI information provided from the BSs through a backhaul.

Regarding the PMI coordination technique, BSs determine a precode or matrix for beamforming using PMI information exchanged with other BSs through the backhaul.

A wireless communication system provides a femto-cell service for providing a high-speed data service while addressing a service problem of a propagation shadow area. Here, the femto cell denotes a service area of a compact BS, which has access to a mobile communication core network through a commercial broadband network.

With respect to providing the femto-cell service, dozens of femto cells can exist within a macro cell. In this case, the macro cell and femto cells need a lot of backhaul capacity to exchange information with each other. In addition, there is a problem in that, as the number of cells adjacent to an MS increases, an amount of information that the MS feeds back to a serving station increases and adjacent cell information for the serving station to consider in order to mitigate inter-cell interference also increases, thereby increasing a complexity for mitigating the inter-cell interference.

SUMMARY OF THE INVENTION

An aspect of the present invention is to address at least the above-mentioned problems and/or disadvantages and to provide at least the advantages described below. Accordingly, an aspect of the present invention is to provide an apparatus and method for mitigating inter-cell interference in a wireless communication system including a femto cell.

Another aspect of the present invention is to provide an apparatus and method for mitigating inter-cell interference with no information exchange using a backhaul between a macro Base Station (BS) and a femto BS in a wireless communication system.

A further aspect of the present invention is to provide an apparatus and method for restricting a codebook available for beamforming every resource block in a macro BS of a wireless communication system.

Yet another aspect of the present invention is to provide an apparatus and method for determining an available resource block according to an amount of interference from a macro BS in a Mobile Station (MS) receiving a service from a femto BS.

Still another aspect of the present invention is to provide an apparatus and method for performing iterative power control in consideration of feedback information provided from an MS in a femto BS of a wireless communication system.

The above aspects are addressed by providing an apparatus and method for interference mitigation in a wireless communication system.

In accordance with an aspect of the present invention, a method for mitigating inter-cell interference in a macro BS of a wireless communication system having at least one femto cell is provided. The method includes restricting the use of at least one code among at least one available code when forming a beam by resource block, constructing a codebook set for each resource block, when feedback information is received from at least one MS, allocating a resource to the MS in consideration of the feedback information, determining a weight for forming a beam to the MS in consideration of the codebook set for each resource block and the resource allocated to the MS, and forming the beam to the MS using the weight.

In accordance with another aspect of the present invention, a method for mitigating inter-cell interference in an MS receiving a service from a macro BS in a wireless communication system having at least one femto cell is provided. The method includes determining a codebook set for each resource block, the codebook set being constructed by restricting at least one code among at least one available code when forming a beam by resource block in the macro BS, estimating a channel with the macro BS and a channel with at least one adjacent femto BS, estimating a Signal to Interference and Noise Ratio (SINR) for at least one code available by at least one resource block in consideration of the channel with the macro BS and the channel with the at least one adjacent femto BS, determining a code capable of obtaining the maximum sum rate by at least one resource block using the SINR, and feeding back the maximum sum rate for the at least one resource block and the determined code to the macro BS. The at least one code available by resource block is included in the codebook set.

In accordance with a further aspect of the present invention, a method for mitigating inter-cell interference in a femto BS of a wireless communication system having at least one femto cell is provided. The method includes, when receiving feedback information from at least one MS, allocating a resource for service provision to the MS in consideration of at least one piece of resource block information available in the MS, included in the feedback information, updating a transmit power for transmitting a signal through iterative power control in consideration of an SINR for each resource block, included in the feedback information, and transmitting a signal using the resource allocated to the MS and the updated transmit power.

In accordance with yet another aspect of the present invention, a method for mitigating inter-cell interference in an MS receiving a service from a femto BS in a wireless communication system having at least one femto cell is provided. The method includes determining a codebook set for each resource block, which is constructed by restricting at least one code among at least one available code when forming a beam by resource block in a macro BS, calculating a correlation value of the at least one code available when forming the beam by resource block, calculating the greatest amount of interference from the macro BS by resource block in consideration of the correlation value of the code, determining at least one resource block available when receiving a service from the femto BS in consideration of the greatest amount of interference of the resource blocks, and feeding back at least one available resource block information to the femto BS. The at least one code available when forming the beam by resource block is included in the codebook set.

In accordance with still another aspect of the present invention, an apparatus for mitigating inter-cell interference in a macro BS of a wireless communication system having at least one femto cell is provided. The apparatus includes at least one antenna, a codebook controller, a resource allocator, a weight generator, and a precoder. The codebook controller restricts at least one code among at least one available code when forming a beam by resource block and constructs a codebook set for each resource block. When feedback information is received from at least one MS, the resource allocator allocates a resource to the MS in consideration of the feedback information. The weight generator determines a weight for forming a beam to the MS in consideration of the codebook set for each resource block and the resource allocated to the MS. The precoder precodes a transmit signal using the weight.

In accordance with still another aspect of the present invention, an apparatus for mitigating inter-cell interference in an MS receiving a service from a macro BS in a wireless communication system having at least one femto cell is provided. The apparatus includes at least one antenna, a codebook controller, a channel estimator, an SINR estimator, and a feedback controller. The codebook controller stores a codebook set for each resource block, constructed by restricting at least one code among at least one available code when forming a beam by resource block in the macro BS. The channel estimator estimates a channel with the macro BS and a channel with at least one adjacent femto BS using a signal received through the antenna. The SINR estimator estimates an SINR for at least one code available by at least resource block in consideration of the channel with the macro BS and the channel with the at least one adjacent femto BS. The feedback controller feeds back a code, which is capable of obtaining the maximum sum rate by at least one resource block using the SINR and the maximum sum rate for the resource block, to the macro BS. The at least one code available by resource block is included in the codebook set.

In accordance with still another aspect of the present invention, an apparatus for mitigating inter-cell interference in a femto BS of a wireless communication system having at least one femto cell is provided. The apparatus includes at least one antenna, a feedback information receiver, a resource allocator, a power controller, and a transmitter. The feedback information receiver receives feedback information from at least one MS. The resource allocator allocates a resource for service provision to an MS in consideration of at least one piece of resource block information available in the MS, included in the feedback information received through the feedback information receiver. The power controller updates a transmit power for transmitting a signal through iterative power control in consideration of an SINR for each resource block, included in the feedback information. The transmitter transmits a signal using the resource allocated to the MS and the updated transmit power.

In accordance with still another aspect of the present invention, an apparatus for mitigating inter-cell interference in an MS receiving a service from a femto BS in a wireless communication system having at least one femto cell is provided. The apparatus includes at least one antenna, a receiver, a codebook controller, an interference determiner, and a feedback controller. The receiver receives a signal through the antenna. The codebook controller stores a codebook set for each resource block, constructed by restricting at least one code among at least one available code when forming a beam by resource block in a macro BS. The interference determiner calculates the greatest amount of interference from the macro BS by resource block in consideration of a correlation value of the at least one code available when forming the beam by resource block. The feedback controller feeds back at least one piece of resource block information available when receiving a service from the femto BS, to the femto BS in consideration of the greatest amount of interference of the resource blocks.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
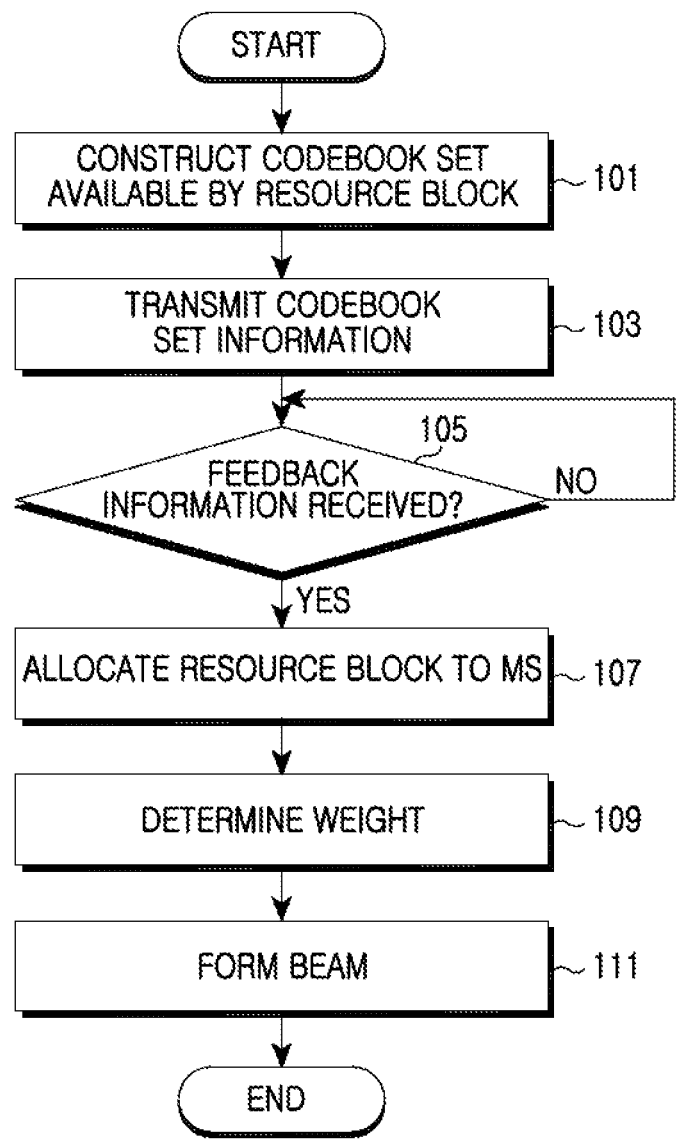
FIG. 1 is a flow diagram illustrating a procedure for transmitting a signal in a macro Base Station (BS) according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A technology for mitigating inter-cell interference with no information exchange using a backhaul between a macro Base Station (BS) and a femto BS in a wireless communication system including a femto cell according to exemplary embodiments of the present invention is described below.

The following description is made assuming an Orthogonal Frequency Division Multiplexing (OFDM) wireless communication system. However, exemplary embodiments of the present invention are equally applicable to other wireless communication system.

In the following description, a macro Mobile Station (MS) denotes an MS receiving a service from a macro BS, and a femto MS denotes an MS receiving a service from a femto BS.

In the following description, it is assumed that a macro BS includes antennas of $N_T$ number, and a macro MS includes antennas of $N_R$ number. Also, it is assumed that a femto BS and a femto MS each include one antenna. However, exemplary embodiments of the present invention are equally applicable when any of the macro BS, the macro MS, the femto BS, and the femto MS have a different number of antennas. If the femto MS and macro MS include a plurality of antennas, the femto MS and macro MS may either receive one stream through one antenna or combine signals received through the plurality of antennas and receive at least one stream.

FIG. 1 illustrates a procedure for transmitting a signal in a macro BS according to an exemplary embodiment of the present invention.

Referring to FIG. 1, in step 101, the macro BS restricts a codebook available by resource block to, when forming a beam to a macro MS, restrict the direction of beamforming in a spatial domain such that interference in a femto cell is restricted. That is, the macro BS restricts a codebook set by resource block such that, when forming a beam, the macro BS can form the beam only in the partial direction of the whole spatial domain. For example, the macro BS designates a unique code ($u_n$) by resource block. After that, the macro BS constructs a codebook set available in a resource block through a correlation with a unique code designated to a resource block, as given in Equation 1 below. At this time, the macro BS can pseudo-randomly select the unique code ($u_n$) by resource block.

$$W_{t,f} = \{W_n | n = \arg(u_n^H \cdot u_n^{t,f} > \text{Threshold})\} \quad (1)$$

In Equation 1, the '$W_{t,f}$' represents a codebook set available in a resource block ($R_{t,f}$), which is the $t^{th}$ time in time axis and the $f^{th}$ time in frequency axis, the '$W_n$' represents an $n^{th}$ code, the 'n' represents a codebook index, the '$u_n$' represents a matrix of the $n^{th}$ code, and the 'Threshold' represents a threshold for selecting a code available in the resource block ($R_{t,f}$).

As in Equation 1 above, the macro BS constructs the codebook set available in the resource block ($R_{t,f}$) by codes whose correlations with the unique code ($u_n$) designated to the resource block ($R_{t,f}$) are equal to or are greater than the threshold.

After constructing the codebook set available by resource block, the macro BS proceeds to step 103 and transmits the codebook set information constructed in step 101 to a femto BS or a macro MS. For example, in a case where the femto BS has initial access, the macro BS transmits codebook set information available by resource block, to the femto BS through a core network. For another example, the macro BS may transmit codebook set information available by resource block, to macro MSs through a broadcast control message.

After that, the macro BS proceeds to step 105 and determines if feedback information is received from a macro MS. Here, the feedback information received from the macro MS includes the greatest sum rate in at least one resource block and code information capable of obtaining the greatest sum rate.

In a case where the feedback information is received from the macro MS, the macro BS proceeds to step 107 and, on the basis of the feedback information, the macro BS allocates a resource to the macro MS to be serviced. For example, the macro BS determines a resource block to allocate a resource to the macro MS on the basis of the feedback information.

After that, the macro BS allocates a resource for service provision to the macro MS using the determined resource block. At this time, the macro BS allocates the macro MS the resource according to a scheduling type.

After allocating the resource to the macro MS, the macro BS proceeds to step 109 and, on the basis of the feedback information, determines a weight for forming a beam to the macro MS. For example, in a case where the macro BS allocates a macro MS a resource of a resource block ($R_{t,f}$) in step 107, the macro BS determines a code capable of obtaining the greatest sum rate in the resource block ($R_{t,f}$), included in the feedback information, as a weight for beamforming After determining the weight for beamforming, the macro BS proceeds to step 111 and forms a beam to a corresponding macro MS using the weight determined in step 109.

After that, the macro BS terminates the procedure according to the exemplary embodiment of the present invention.

Figure 2:
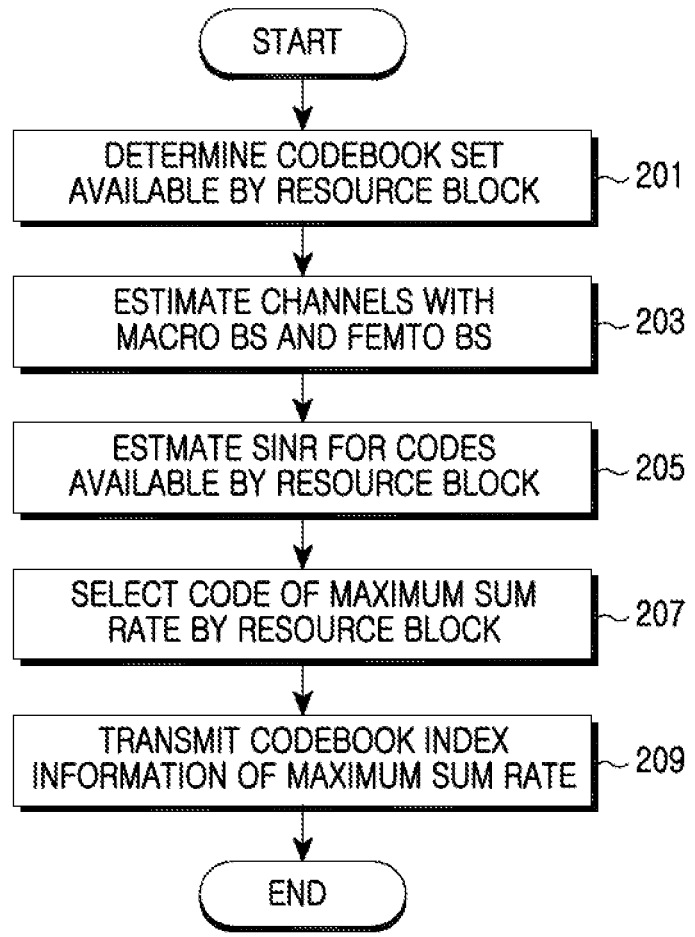
FIG. 2 is a flow diagram illustrating a procedure for selecting a codebook in a macro Mobile Station (MS) according to an exemplary embodiment of the present invention.

As described above, in a case where a macro BS restricts a codebook set available by resource block, a macro MS operates as illustrated in FIG. 2 below.

FIG. 2 illustrates a procedure for selecting a codebook in a macro MS according to an exemplary embodiment of the present invention.

Referring to FIG. 2, in step 201, the macro MS determines codebook set information available by resource block constructed by a macro BS. For example, the macro MS determines codebook set information available by resource block through a broadcast control message transmitted by the macro BS. For another example, the macro MS may directly generate codebook set information constructed by the macro BS. That is, in a case where the macro BS constructs a codebook set available by resource block in a constant pattern, the macro MS can be aware of the pattern in which the macro BS constructs the codebook set, through identifier information of the macro BS. Thus, the macro MS may directly generate the codebook set information constructed by the macro BS.

After determining the codebook set information available by resource block, the macro MS proceeds to step 203 and estimates a channel with the macro BS and channels with adjacent femto BSs.

After that, the macro MS proceeds to step 205 and estimates a Signal to Interference and Noise Ratio (SINR) for codes available by resource block. That is, regarding at least one resource block capable of being allocated from a macro BS, the macro MS estimates an SINR for each of codes available by the resource block. For example, in a case where the macro BS transmitting a signal through one subcarrier included in a resource block ($R_{t,f}$) allocates an $m^{th}$ code to a $k^{th}$ macro MS, the signal received by the $k^{th}$ macro MS can be expressed as given in Equation 2 below.

$$y_{k,m} = \sqrt{\eta}\, h_{MtoM,k,n} \sum_{n}^{N_s} w_{m,n} x_n + \sum_{f \in B_{Femto\ BS}} h_{FtoM,k,n,f} x_f + v_k, \qquad (2)$$

$$k \in K_{Macro\ MS},\ m \in M_{t,f}$$

In Equation 2, the '$y_{k,m}$' represents a signal received by a $k^{th}$ macro MS in a case where a macro BS transmitting a signal through one subcarrier included in a resource block ($R_{t,f}$) allocates an $m^{th}$ code to the $k^{th}$ macro MS, the '$h_{MtoM,k,n}$' represents a channel vector from a macro BS including transmit antennas of $N_t$ number to an $n^{th}$ stream of the $k^{th}$ macro MS, the '$W_{m,n}$' represents an $n^{th}$ column of the $m^{th}$ code ($W_m$), the '$x_n$' represents a signal transmitted by the macro BS, the '$h_{FtoM,k,n,f}$' represents a channel vector from an $f^{th}$ femto BS to the $n^{th}$ stream of the $k^{th}$ macro MS, the '$x_f$' represents a signal transmitted by the $f^{th}$ femto BS, the '$v_k$' represents an Additive White Gaussian Noise (AWGN) for the $k^{th}$ macro MS, and the '$\eta$' represents power loaded on each stream. Here, the '$\eta$' represents a value of dividing power ($P_{Macro}$) allocated to one subcarrier by the number ($N_s$) of the whole stream. Also, the $n^{th}$ stream represents a stream of the $n^{th}$ time among streams of $N_s$ number.

At this time, an SINR of the signal received through the $n^{th}$ stream of the $k^{th}$ macro MS can be calculated as given in Equation 3 below.

$$SINR_{k,m,n} = \frac{\eta \alpha_{k,m,n}}{N_{k,n} + \eta \sum_{n \in N_s - \{n\}} \alpha_{k,m,n} + I_{FtoM,n}} \qquad (3)$$

In Equation 3, the '$SINR_{k,m,n}$' represents an SINR of a signal received through an $n^{th}$ stream of a $k^{th}$ macro MS in a case where a macro BS allocates the $k^{th}$ macro MS an $m^{th}$ code at one subcarrier included in a resource block ($R_{t,f}$), the '$\alpha_{k,m,n}$' represents power ($|h_{MtoM,k,n} W_{m,n}|^2$) of a signal received from the macro BS, the '$I_{FtoM,n}$' represents power $$\left( \sum_{f \in B_{Femto\ BS}} |h_{FtoM,k,n,f}|^2 P_f \right)$$

of interference signals received from femto BSs, the '$N_{k,n}$' represents a noise power of the $k^{th}$ macro MS receiving the signal through the $n^{th}$ stream, the $$`\sum_{n \in N_s - \{n\}} \alpha_{k,m,n}\text{'}$$

represents a self cell interference power at which the $n^{th}$ stream is influenced by interference from other stream, and the '$\eta$' represents power loaded on each stream. At this time, the '$\eta$' represents a value of dividing power ($P_{Macro}$) allocated to one subcarrier by the number ($N_s$) of the whole stream.

After estimating the SINR for each code available by resource block, the macro MS proceeds to step 207 and selects a code capable of obtaining the greatest sum rate by resource block, using the estimated SINR. For example, the macro MS selects a code capable of obtaining the greatest sum rate among codes available in a resource block ($R_{t,f}$), using Equation 4 below.

$$R_k = \max_{m \in M_{t,f}} \sum_{n=1}^{N_s} \log_2(1 + SINR_{k,m,n}) \qquad (4)$$

In Equation 4, the '$R_k$' represents the maximum sum rate obtainable using codes included in a codebook set available in a resource block ($R_{t,f}$), the '$M_{t,f}$' represents the number of the codes included in the codebook set available in the resource block ($R_{t,f}$), the '$N_s$' represents the number of all streams, and the '$SINR_{k,m,n}$' represents an SINR of a signal received through an $n^{th}$ stream of a $k^{th}$ macro MS in a case where the macro BS allocates the $k^{th}$ macro MS an $m^{th}$ code at one subcarrier included in the resource block ($R_{t,f}$).

After selecting the code capable of obtaining the maximum sum rate by resource block, the macro MS proceeds to step 209 and transmits the selected code capable of obtaining the maximum sum rate by resource block and the maximum sum rate, to the macro BS. In other words, the marco MS transmits codebook index information of the maximum sum rate.

After that, the macro MS terminates the procedure according to the exemplary embodiment of the present invention.

Figure 3:
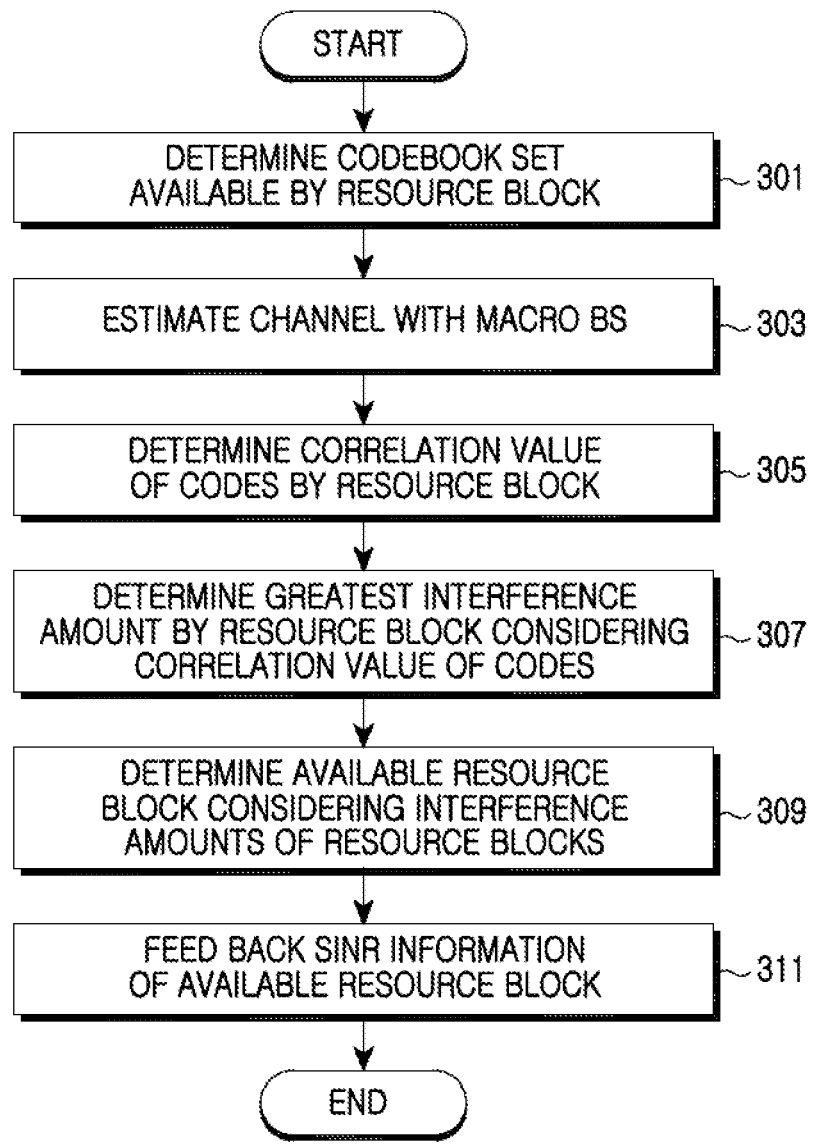
FIG. 3 is a flow diagram illustrating a procedure for selecting a resource block in a femto MS according to an exemplary embodiment of the present invention.

In a case where a macro BS restricts a codebook set available by resource block, a femto MS operates as illustrated in FIG. 3 below.

FIG. 3 illustrates a procedure for selecting a resource block in a femto MS according to an exemplary embodiment of the present invention.

Referring to FIG. 3, in step 301, the femto MS determines codebook set information available by resource block constructed by a macro BS. For example, the femto MS determines codebook set information available by resource block through a broadcast control message transmitted by a femto BS. For another example, the femto MS may directly generate codebook set information constructed by the macro BS. That is, in a case where the macro BS constructs a codebook set available by resource block in a constant pattern, the femto MS can be aware of the pattern in which the macro BS constructs the codebook set, through identifier information of the macro BS. Thus, the femto MS may directly generate the codebook set information constructed by the macro BS.

After determining the codebook set information available by resource block, the femto MS proceeds to step 303 and estimates an interference channel with the macro BS. For example, in a case where an $f^{th}$ femto BS transmitting a signal through one subcarrier included in a resource block ($R_{t,f}$) allocates an $m^{th}$ code to a $k^{th}$ femto MS, the signal received by the $k^{th}$ femto MS can be expressed as given in Equation 5 below.

$$y_{k,f,m} = \sqrt{P_f} h_{FtoF,k,f} x_f + \sum_{f \in B_{Femto\ BS} - \{f\}} \sqrt{P_f} h_{FtoF,k,f} x_f + \sqrt{\eta} h_{MtoF,k} \sum_{n}^{N_s} w_{m,n} x_n + v_k, k \in K_{FemtoMS} \quad (5)$$

In Equation 5, the '$y_{k,f,m}$' represents a signal received by a $k^{th}$ femto MS in a case where an $f^{th}$ femto BS transmitting a signal through one subcarrier included in a resource block ($R_{t,f}$) allocates an $m^{th}$ code to the $k^{th}$ femto MS, the '$h_{FtoF,k,f}$' represents a channel vector from the $f^{th}$ femto BS to the $k^{th}$ femto MS, the '$x_f$' represents the signal transmitted by the $f^{th}$ femto BS, the '$P_f$' represents a transmit power of the $f^{th}$ femto BS, the '$h_{MtoF,k}$' represents a channel vector from a macro BS to the $k^{th}$ femto MS, the '$W_{m,n}$' represents an $n^{th}$ column of an $m^{th}$ code ($W_m$), the '$v_k$' represents an AWGN for the $k^{th}$ femto MS, and the '$\eta$' represents power loaded on each stream. At this time, the '$\eta$' represents a value of dividing power ($P_{Macro}$) allocated to one subcarrier by the number ($N_s$) of the whole stream.

In a case where the $k^{th}$ femto MS receives the signal of Equation 5, an SINR of the receive signal can be calculated as given in Equation 6 below.

$$SINR_{k,f} = \frac{P_f |h_{FtoF,k,f}|^2}{N_k + I_{FtoF} + I_{MtoF,m}} \quad (6)$$

In Equation 6, the '$SINR_{k,f}$' represents an SINR of a signal received by a $k^{th}$ femto MS, the '$P_f$' represents a transmit power of an $f^{th}$ femto BS, the '$h_{FtoF,k,f}$' represents a channel vector from the $f^{th}$ femto BS to the $k^{th}$ femto MS, the '$I_{FtoM,m}$' represents power $$\left(\eta \sum_{n \in N_S} |h_{MtoF,k} W_{m,n}|^2\right)$$

of an interference signal received from a macro BS, the '$I_{FtoF}$' represents power $$\left(\sum_{f \in B_{Femto\ BS} - \{f\}} P_f |h_{FtoF,k,f}|^2\right)$$

of interference signals received from adjacent femto BSs, the '$N_k$' represents a noise power of the $k^{th}$ femto MS, the '$W_{m,n}$' represents an $n^{th}$ column of an $m^{th}$ code ($W_m$), and the '$\eta$' represents power loaded on each stream. At this time, the '$\eta$' represents a value of dividing power ($P_{Macro}$) allocated to one subcarrier by the number ($N_s$) of the whole stream.

In calculating the SINR of the $k^{th}$ femto MS as given in Equation 6 above, it is assumed that a relationship of $I_{MtoF,m} >> I_{FtoF}$ is formed since the macro BS has a greater amount of interference on the $k^{th}$ femto MS than adjacent femto BSs. In this case, the femto MS can disregard interference of the adjacent femto BSs and thus, estimates the channel from the macro BS to mitigate interference of the macro BS.

After that, the femto MS proceeds to step 305 and calculates correlation values between all codes available by resource block using the estimated interference channel with the macro BS. For example, in a case where the macro BS uses an $n^{th}$ column of an $m^{th}$ code included in a codebook set ($W_{t,f}$), a $k^{th}$ femto MS calculates a correlation value of a codebook as given in Equation 7 below.

$$\beta_{k,m,n} = |h_{MtoF,k} W_{m,n}|^2 / |H_{MtoF,k}|^2, k \in K_{FemtoMS}, m \in M_{t,f} \quad (7)$$

In Equation 7, the '$\beta_{k,m,n}$' represents a correlation value of a codebook calculated by a $k^{th}$ femto MS in a case where a macro BS uses an $n^{th}$ column of an $m^{th}$ code included in a codebook set ($W_{t,f}$), the '$h_{MtoF,k}$' represents a channel vector from the macro BS to the $k^{th}$ femto MS, the '$W_{m,n}$' represents the $n^{th}$ column of the $m^{th}$ code ($W_m$), the '$K_{Femto\ MS}$' represents the number of femto MSs, and the '$M_{t,f}$' represents the number of codes included in the codebook set ($W_{t,f}$).

After calculating correlation values between codes by resource block in step 305, the femto MS proceeds to step 307 and calculates the greatest amount of interference by resource block. That is, the femto MS calculates the maximum value among the sum of correlation values of respective streams as given in Equation 8 below.

$$\gamma_k = \max_{m \in M_{t,f}} \sum_{n=1}^{N_S} \beta_{k,m,n} \quad (8)$$

In Equation 8, the '$\gamma_k$' represents the maximum value among the sum of correlation values of respective streams, the '$M_{t,f}$' represents the number of codes included in a codebook set ($W_{t,f}$), the '$N_s$' represents the number of all streams, and the '$\beta_{k,m,n}$' represents a correlation value of a codebook calculated by a $k^{th}$ femto MS in a case where a macro BS uses an $n^{th}$ column of an $m^{th}$ code included in the codebook set ($W_{t,f}$).

As given in Equation 8, the $k^{th}$ femto MS calculates a normalized amount of interference, which is generated when selecting a code inducing the greatest interference from the macro BS among all codes available in a specific resource block.

After calculating the greatest amount of interference by resource block, the femto MS proceeds to step 309 and determines an available resource block in consideration of the greatest amount of interference for each resource block. For example, the femto MS determines, as an available resource block, a resource block whose greatest amount of interference is less than a threshold (T) amount of interference among resource blocks.

After determining the available resource block in step 309, the femto MS proceeds to step 311 and feeds back SINR information of the available resource block to a serving femto BS. If there exist a plurality of available resource blocks, the femto MS determines the number of resource blocks for feedback to the femto BS in consideration of a resource allocation technique of the femto BS and a scheduling criterion. For instance, the femto MS feeds back SINR information on resource blocks of the determined number to the femto BS in order of high SINR among available resource blocks.

After that, the femto MS terminates the procedure according to the exemplary embodiment of the present invention.

As described above, by selecting resource blocks whose greatest amounts of interference are less than a threshold interference amount among resource blocks and sending a feedback to a femto BS, a femto MS can restrict, by $T\eta|h_{MtoF,k}|^2$, the maximum value of interference ($I^*_{MtoF}$) from a macro BS to the femto MS itself, as given in Equation 9 below.

$$I^*_{MtoF} = \gamma_k \eta |h_{MtoF,k}|^2 = \max_{m \in M_{t,f}} \eta \sum_{n=1}^{N_s} |h_{MtoF,k} W_{m,n}|^2 < T\eta |h_{MtoF,k}|^2 \quad (9)$$

In Equation 9, the '$I_{MtoF}$' represents the maximum value of interference from a macro BS to a femto MS, the '$\gamma_k$' represents the maximum value among the sum of correlation values of respective streams, the '$h_{MtoF, k}$' represents a channel vector from the macro BS to a $k^{th}$ femto MS, the '$W_{m,n}$' represents an $n^{th}$ column of an $m^{th}$ code ($W_m$), the 'T' represents a threshold amount of interference, the '$M_{t,f}$' represents the number of codes included in a codebook set ($W_{t,f}$), and the '$\eta$' represents power loaded on each steam. At this time, the '$\eta$' represents a value of dividing power ($P_{Macro}$) allocated to one subcarrier by the number ($N_s$) of the whole stream.

The following description is made for an operation of a femto BS for transmitting a signal using feedback information received from a femto MS.

Figure 4:
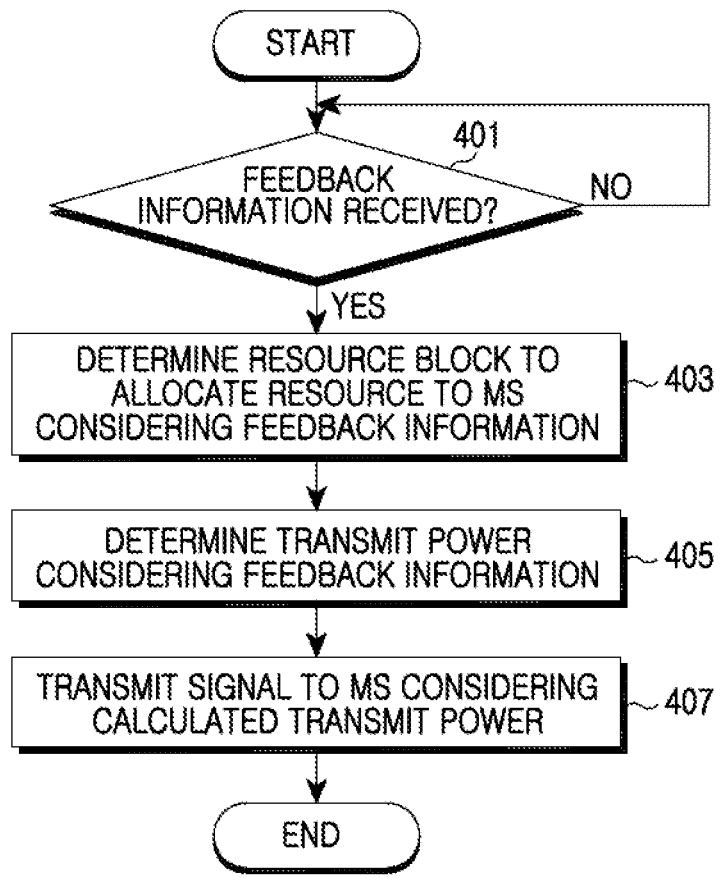
FIG. 4 is a flow diagram illustrating a procedure for transmitting a signal in a femto BS according to an exemplary embodiment of the present invention.

FIG. 4 illustrates a procedure for transmitting a signal in a femto BS according to an exemplary embodiment of the present invention.

Referring to FIG. 4, in step 401, the femto BS determines if feedback information is received from a femto MS positioned in a service area.

If the feedback information is received from the femto MS, the femto BS proceeds to step 403 and allocates a resource for service provision to the femto MS in consideration of the feedback information. For example, the femto BS can determine at least one resource block available in a femto MS through the feedback information. Thus, the femto BS determines a resource block to use to allocate a resource to the femto MS, among the resource blocks available in the femto MS. After that, the femto BS allocates a resource for service provision to the femto MS using the determined resource block.

After allocating the femto MS the resource for service provision, the femto BS proceeds to step 405 and determines a transmit power for transmitting a signal to the femto MS in consideration of the feedback information. For instance, the femto BS determines a transmit power through iterative power control as given in Equation 10 below.

$$P_f(t+1) = \min\left[\frac{\Gamma_k \cdot (N_k + I_{FtoF}(P_f(t)) + I_{MtoF,m}(t))}{|h_{FtoF,k,f}|^2}, P_f^{max}\right] \quad (10)$$

In Equation 10, the '$P_f(t+1)$' represents a transmit power of an $f^{th}$ femto BS at a time (t+1), the '$\Gamma_k$' represents a target CINR desired by a $k^{th}$ femto MS, the '$P_f^{max}$' represents the maximum transmit power in the $f^{th}$ femto BS, the '$N_k$' represents a noise of the $k^{th}$ femto MS, the '$I_{FtoF}(P_f(t))$' represents interference from adjacent femto BSs to a femto MS when the $f^{th}$ femto BS uses a transmit power ($P_f(t)$) at a $t^{th}$ time, the '$I_{MtoF, m}(t)$' represents interference from a macro BS to the femto MS during a time (t), and the '$h_{FtoF, k, f}$' represents a channel vector from the $f^{th}$ femto BS to the $k^{th}$ femto MS.

After determining the transmit power in step 405, the femto BS proceeds to step 407 and transmits a signal to the femto MS using the resource allocated to the femto MS in step 403 and the transmit power determined in step 405.

After that, the femto BS terminates the procedure according to the exemplary embodiment of the present invention.

Although not illustrated, a femto BS is provided with codebook set information available by resource block from a macro BS through a core network, for example. For another example, the femto BS may directly generate codebook set information constructed by the macro BS. That is, in a case where the macro BS constructs a codebook set available by resource block in a constant pattern, the femto BS can be aware of the pattern in which the macro BS constructs the codebook set, through identifier information of the macro BS. Thus, the femto BS may directly generate the codebook set information constructed by the macro BS.

In the aforementioned exemplary embodiment, a femto MS assumes the maximum amount of interference by resource block in place of an absolute amount of interference, as an amount of interference from a macro BS, and determines a resource block available for communication with a serving BS. The reason for this is given as follows. That is, an amount of interference from the macro BS to the femto MS is different depending on a transmit power of the macro BS and a distance between a femto cell and the macro BS. However, a femto BS and the femto MS cannot, in advance, be aware of whether the macro BS allocates each resource block at any transmit power. Thus, in a case where the femto BS determines a resource block to allocate a resource to the femto MS, it is advantageous in mitigating interference from the macro BS that the femto BS selects a resource block with an amount of interference less than the absolute amount of interference as compared to other resource blocks. Thus, the femto MS assumes the maximum amount of interference by resource block in place of the absolute amount of interference, as the amount of interference from the macro BS, and determines the available resource block.

The following description is made for a construction of a macro BS for restricting a codebook set available by resource block.

Figure 5:
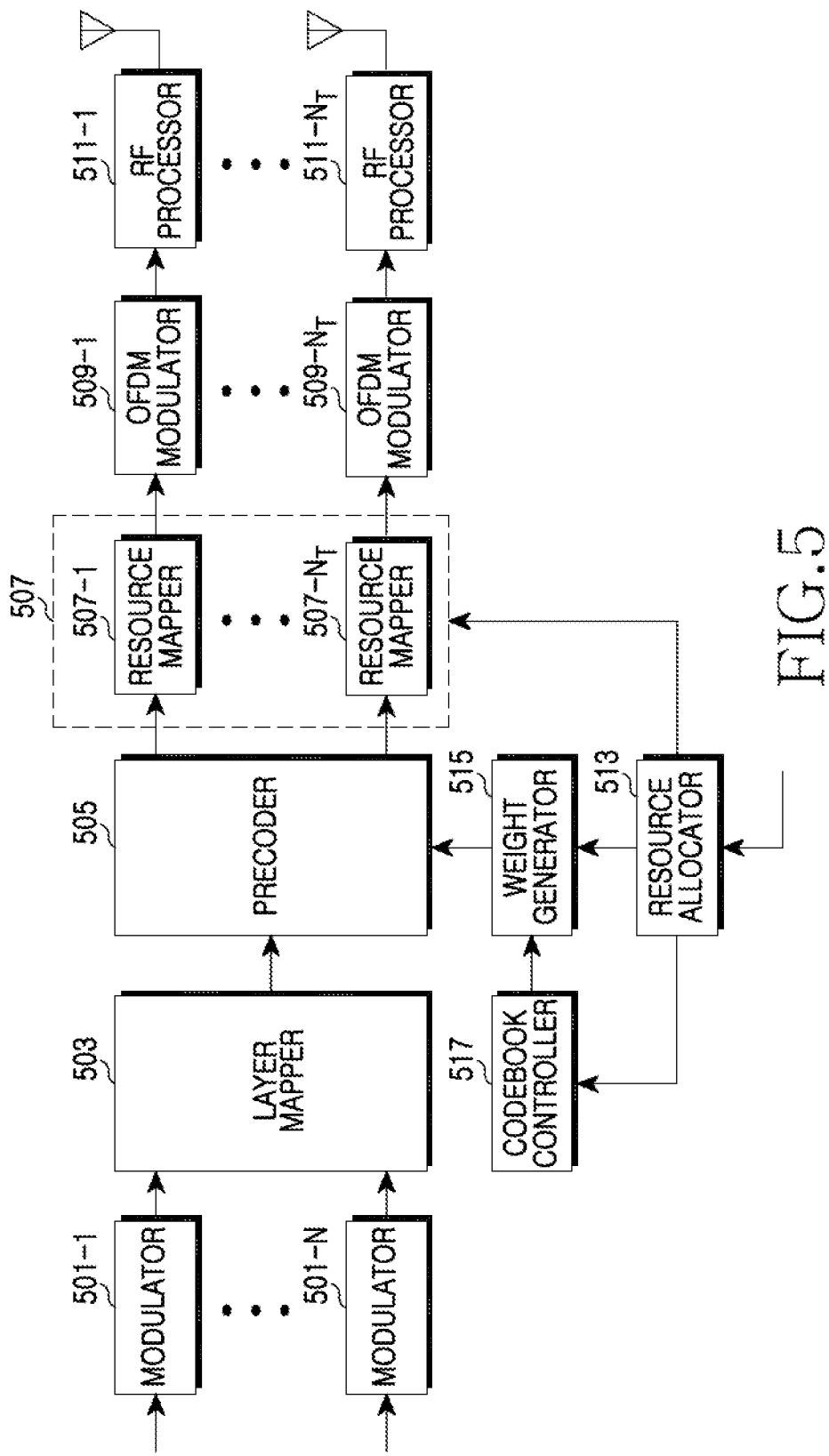
FIG. 5 is a block diagram illustrating a construction of a macro BS according to an exemplary embodiment of the present invention.

FIG. 5 is a block diagram illustrating a construction of a macro BS according to an exemplary embodiment of the present invention.

Referring to FIG. 5, the macro BS includes modulators 501-1 to 501-$N_T$, ha layer mapper 503, a precoder 505, resource mappers 507 including resource mappers 507-1 to 507-$N_T$, OFDM modulators 509-1 to 509-$N_T$, Radio Frequency (RF) processors 511-1 to 511-$N_T$, a resource allocator 513, a weight generator 515, and a codebook controller 517.

The modulators 501-1 to 501-N modulate encoded signals provided from respective encoders according to a modulation level suitable to a channel state with each receive end. Here, the modulation level means a Modulation and Coding Scheme (MCS) level.

The layer mapper 503 maps modulation symbols provided from the modulators 501-1 to 501-N, to paths for respective antennas such that the modulation symbols can be transmitted through the respective antennas.

The precoder 505 precodes modulated signals provided from the layer mapper 503 by a precode provided from the weight generator 515, and outputs the precoded signals to the resource mappers 507-1 to 507-$N_T$ connected to the respective antennas.

The resource allocator 513 allocates a resource to a macro MS to get a service, on the basis of feedback information received from macro MSs positioned in a service area. For example, the resource allocator 513 determines a resource block to allocate a resource to a macro MS, on the basis of the feedback information. After that, the resource allocator 513 allocates a resource for service provision to the macro MS using the determined resource block. At this time, the resource allocator 513 allocates the resource to the macro MS according to a corresponding scheduling type. Here, the feedback information received from the macro MS includes the greatest sum rate in at least one resource block and code information capable of obtaining the greatest sum rate in each resource block.

The codebook controller 517 restricts codes available by resource block and constructs a codebook set by resource block. For example, the codebook controller 517 designates a unique code ($u_n$) by resource block. After that, the codebook controller 517 constructs a codebook set available in a resource block through a correlation with a unique code designated to the resource block as given in Equation 1 above. At this time, the codebook controller 517 can pseudo-randomly select the unique code ($u_n$) designated by resource bock.

The weight generator 515 generates a weight for beamforming, in consideration of the feedback information and resource allocation information provided from the resource allocator 513 and the codebook set provided from the codebook controller 517. For example, in a case where the resource allocator 513 allocates a resource of a resource block ($R_{t,f}$) to a macro MS, the weight generator 515 determines a code capable of obtaining the greatest sum rate in the resource block ($R_{t,f}$), included in the feedback information, as a weight for beamforming The resource mappers 507-1 to 507-$N_T$ map signals provided from the precoder 505 through the respective antenna paths, to corresponding resources according to the resource allocation information provided from the resource allocator 513.

The OFDM modulators 509-1 to 509-$N_T$ convert signals provided from the respective resource mappers 507-1 to 507-$N_T$ into time domain signals through Inverse Fast Fourier Transform (IFFT).

The RF processors 511-1 to 511-$N_T$ convert digital signals provided from the respective OFDM modulators 509-1 to 509-$N_T$ into analog signals. After that, the RF processors 511-1 to 511-$N_T$ convert the analog signals into RF signals and transmit the converted RF signals through the corresponding antennas.

The following description is made for a construction of a macro MS for feeding back channel information using a codebook set available by resource block restricted in a macro BS.

Figure 6:
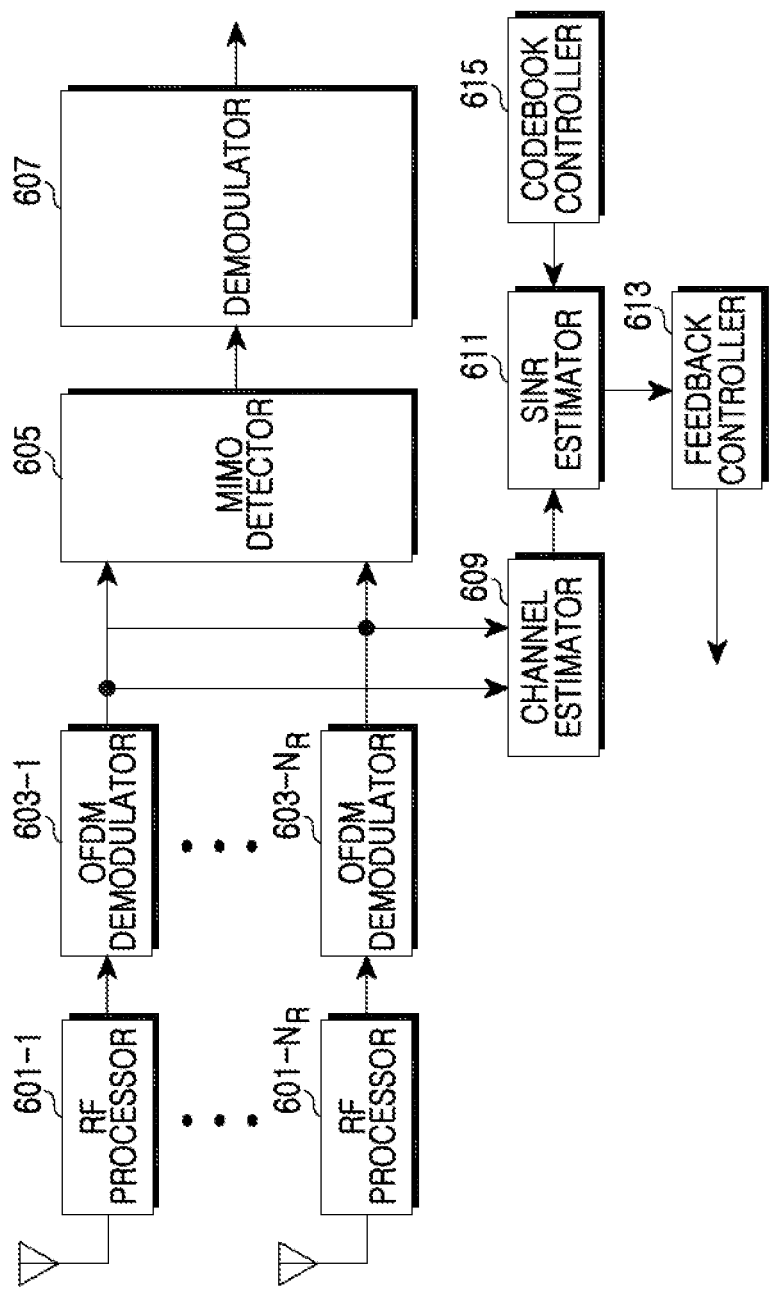
FIG. 6 is a block diagram illustrating a construction of a macro MS according to an exemplary embodiment of the present invention.

FIG. 6 is a block diagram illustrating a construction of a macro MS according to an exemplary embodiment of the present invention.

Referring to FIG. 6, the macro MS includes RF processors 601-1 to 601-$N_R$, OFDM demodulators 603-1 to 603-$N_R$, a Multiple Input Multiple Output (MIMO) detector 605, a demodulator 607, a channel estimator 609, an SINR estimator 611, a feedback controller 613, and a codebook controller 615.

The RF processors 601-1 to 601-$N_R$ convert RF signals received through respective antennas into baseband signals. Also, the RF processors 601-1 to 601-$N_R$ convert the respective baseband signals into digital signals.

The OFDM demodulators 603-1 to 603-$N_R$ convert signals provided from the respective RF processors 601-1 to 601-$N_R$ into frequency domain signals through Fast Fourier Transform (FFT).

The MIMO detector 605 detects a signal, which is transmitted by a macro BS, in multiplexed signals provided from the OFDM demodulators 603-1 to 603-$N_R$. For example, the MIMO detector 605 calculates a Euclidean distance between symbol vectors transmissible in the macro BS, and selects a signal of the shortest Euclidean distance as a signal transmitted by the macro BS.

The demodulator 607 demodulates the signal detected in the MIMO detector 605 according to a corresponding modulation level.

The channel estimator 609 estimates a channel with a macro BS and channels with adjacent femto BSs using signals provided from the OFDM demodulators 603-1 to 603-$N_R$.

The codebook controller 615 stores codebook set information available by resource block constructed by a macro BS. For example, the codebook controller 615 stores codebook set information available by resource block, which is received through a broadcast control message transmitted by the macro BS. For another example, the codebook controller 615 may directly generate and store codebook set information constructed by the macro BS. At this time, the codebook controller 615 can directly generate codebook set information, which is constructed by the macro BS, using identifier information of the macro BS.

The SINR estimator 611 estimates SINRs for codes by each resource block according to codebook set information available by resource block provided from the codebook controller 615. That is, regarding at least one resource block capable of being allocated from the macro BS, the SINR estimator 611 estimates an SINR for each of codes available by the resource block.

The feedback controller 613 sends a feedback of a code capable of obtaining the maximum sum rate for at least one resource block and the maximum sum rate obtainable through the code, to the macro BS in consideration of SINRs of codes by resource block estimated in the SINR estimator 611. At this time, the feedback controller 613 applies the SINR estimated in the SINR estimator 611 to Equation 4 above, and determines the code capable of obtaining the greatest sum rate by each resource block.

The following description is made for a construction of a femto MS for feeding back channel information using a codebook set available by resource block restricted in a macro BS.

Figure 7:
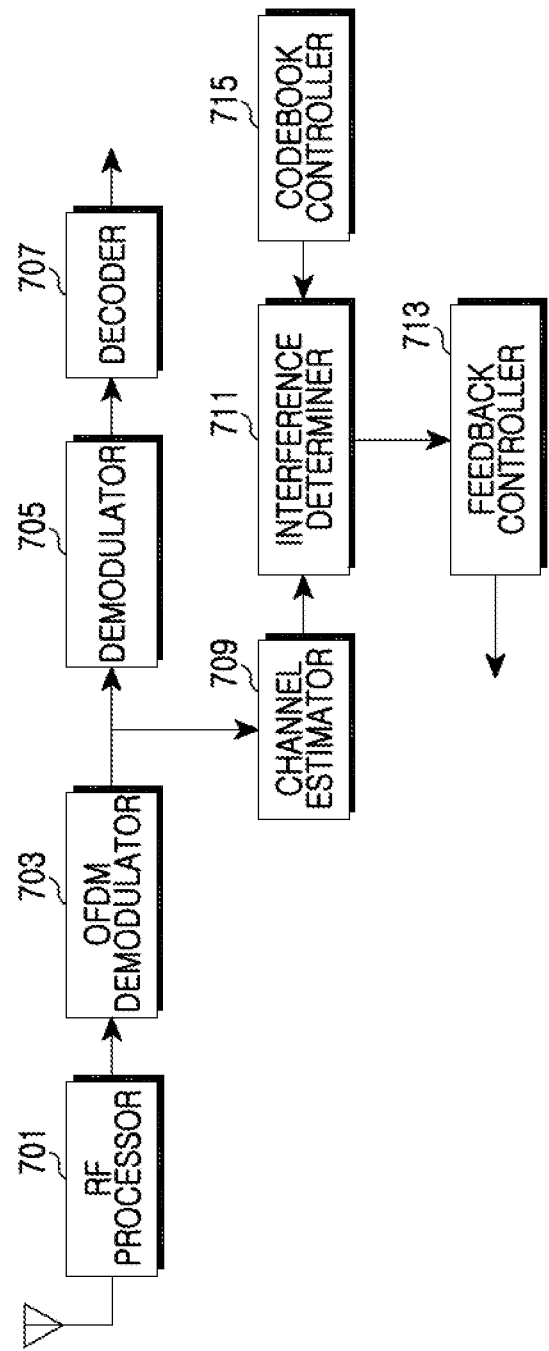
FIG. 7 is a block diagram illustrating a construction of a femto MS according to an exemplary embodiment of the present invention.

FIG. 7 is a block diagram illustrating a construction of a femto MS according to an exemplary embodiment of the present invention.

Referring to FIG. 7, the femto MS includes an RF processor 701, an OFDM demodulator 703, a demodulator 705, a decoder 707, a channel estimator 709, an interference determiner 711, a feedback controller 713, and a codebook controller 715.

The RF processor 701 converts an RF signal received through at least one antenna into a baseband signal. Also, the RF processor 701 converts the baseband signal into a digital signal.

The OFDM demodulator 703 converts a signal provided from the RF processor 701 into a frequency domain signal through FFT.

The demodulator 705 demodulates a signal provided from the OFDM demodulator 703 according to a corresponding modulation level.

The decoder 707 decodes a signal demodulated in the demodulator 705 according to a corresponding modulation level.

The channel estimator 709 estimates a channel with a macro BS using a signal provided from the OFDM demodulator 703. For example, in a case where a $k^{th}$ femto MS calculates an SINR of a received signal as given in Equation 7 above, it is assumed that a relationship of $I_{MtoF, m} \gg I_{FtoF}$ is formed since the macro BS has greater amount of interference on the $k^{th}$ femto MS than adjacent femto BSs. Thus, the channel estimator 709 can disregard interference of the adjacent femto BSs and thus, estimates the channel from the macro BS to mitigate interference of the macro BS.

The codebook controller 715 stores codebook set information available by resource block constructed by a macro BS. For example, the codebook controller 715 stores codebook set information available by resource block, which is received through a broadcast control message transmitted by the macro BS. For another example, the codebook controller 715 may directly generate and store codebook set information constructed by the macro BS. At this time, the codebook controller 715 can directly generate codebook set information, which is constructed by the macro BS, using identifier information of the macro BS.

According to codebook set information available by resource block provided from the codebook controller 715, the interference determiner 711 predicts the greatest amount of interference by resource block. For example, the interference determiner 711 may be distinguished into a correlation unit (not shown) and an interference estimating unit (not shown). The correlation unit calculates correlation values between all codes available by resource block, using an interference channel with a macro BS estimated in the channel estimator 709. If the macro BS uses an $n^{th}$ column of an $m^{th}$ code included in a codebook set ($W_{t,f}$), a correlation unit of a $k^{th}$ femto MS calculates a correlation value of a codebook as given in Equation 7 above.

The interference estimating unit calculates the greatest amount of interference by resource block. For example, the interference estimating unit calculates a normalized amount of interference, which is generated when selecting a code inducing the greatest interference from the macro BS among all codes available in a specific resource block as given in Equation 8 above.

The feedback controller 713 sends a feedback of resource block information available in the femto MS to a serving femto BS, in consideration of the greatest amount of interference by resource block estimated in the interference determiner 711. For example, the feedback controller 713 determines, as an available resource block, a resource block whose greatest amount of interference is less than a threshold (T) amount of interference among resource blocks. If a plurality of available resource blocks exist, the feedback controller 713 determines the number of resource blocks for feedback to the femto BS in consideration of a resource allocation technique of the femto BS and a scheduling criterion. At this time, the feedback controller 713 sends a feedback of SINR information on resource blocks of the determined number, to the femto BS in order of high SINR among the available resource blocks.

The following description is made for a construction of a femto BS for transmitting a signal using feedback information provided from a femto MS.

Figure 8:
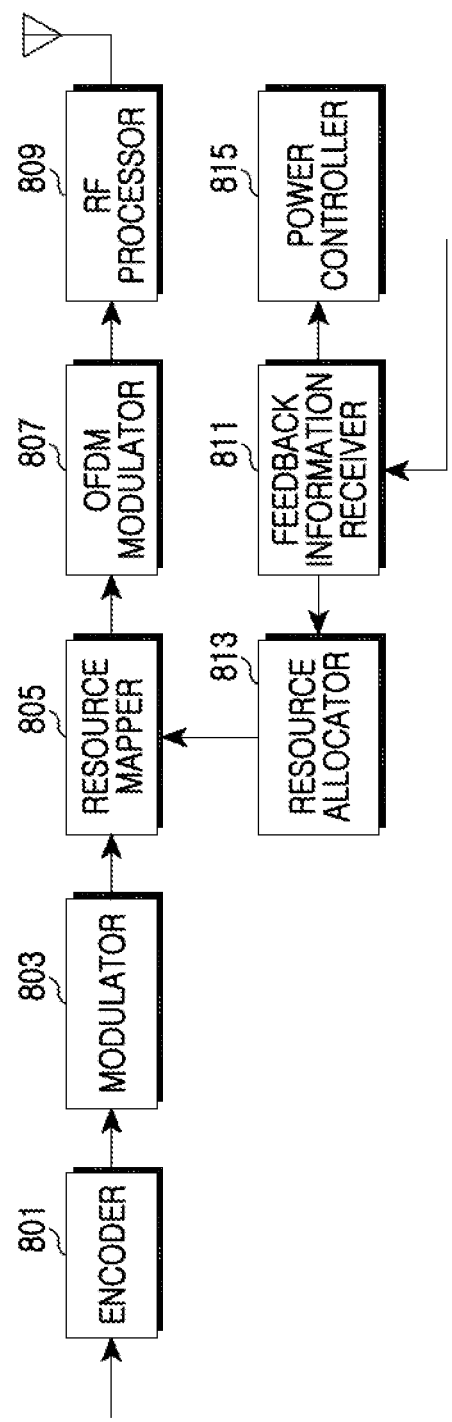
FIG. 8 is a block diagram illustrating a construction of a femto BS according to an exemplary embodiment of the present invention.

FIG. 8 is a block diagram illustrating a construction of a femto BS according to an exemplary embodiment of the present invention.

Referring to FIG. 8, the femto BS includes an encoder 801, a modulator 803, a resource mapper 805, an OFDM modulator 807, an RF processor 809, a feedback information receiver 811, a resource allocator 813, and a power controller 815.

The encoder 801 encodes a signal to be transmitted to a femto MS receiving a service, according to a corresponding modulation level.

The modulator 803 modulates an encoded signal provided from the encoder 801 according to a corresponding modulation level.

The resource mapper 805 maps a signal provided from the modulator 803 to a corresponding resource according to resource allocation information provided from the resource allocator 813.

The feedback information receiver 811 receives feedback information provided from femto MSs positioned in a service area, and provides the feedback information to the resource allocator 813 and the power controller 815.

The resource allocator 813 allocates a resource for service provision to a femto MS in consideration of feedback information provided from the feedback information receiver 811. For example, the resource allocator 813 determines a resource block to allocate a resource to a femto MS, on the basis of feedback information. After that, the resource allocator 813 allocates a resource for service provision to the femto MS using the determined resource block.

The OFDM modulator 807 converts a signal provided from the resource mapper 805 into a time domain signal through IFFT.

The RF processor 809 converts a digital signal provided from the OFDM converter 807 into an analog signal. After that, the RF processor 809 converts the analog signal into an RF signal and transmits the RF signal through a corresponding antenna. At this time, the RF processor 809 amplifies power of a signal according to a transmit power provided from the power controller 815, and transmits the amplified signal.

The power controller 815 determines a transmit power for transmitting a signal to a femto MS in consideration of feedback information provided from the feedback information receiver 811. For example, the power controller 815 determines a transmit power through iterative power control as given in Equation 10 above.

Although not illustrated, the femto BS further includes a codebook controller. The codebook controller stores code set information available by resource block constructed by a macro BS.

The following description is made for a variation of performance dependent on a macro BS restricting a codebook set available by resource block to form a beam, and a femto BS predicts the maximum amount of interference by resource block and controls a resource and a transmit power for a femto MS. A variation of performance is described below on the assumption that a target SINR (F) of the femto MS is equal to 10 dB and distances (R) with a macro BS and a femto cell are equal to 250 m.

Figure 9:
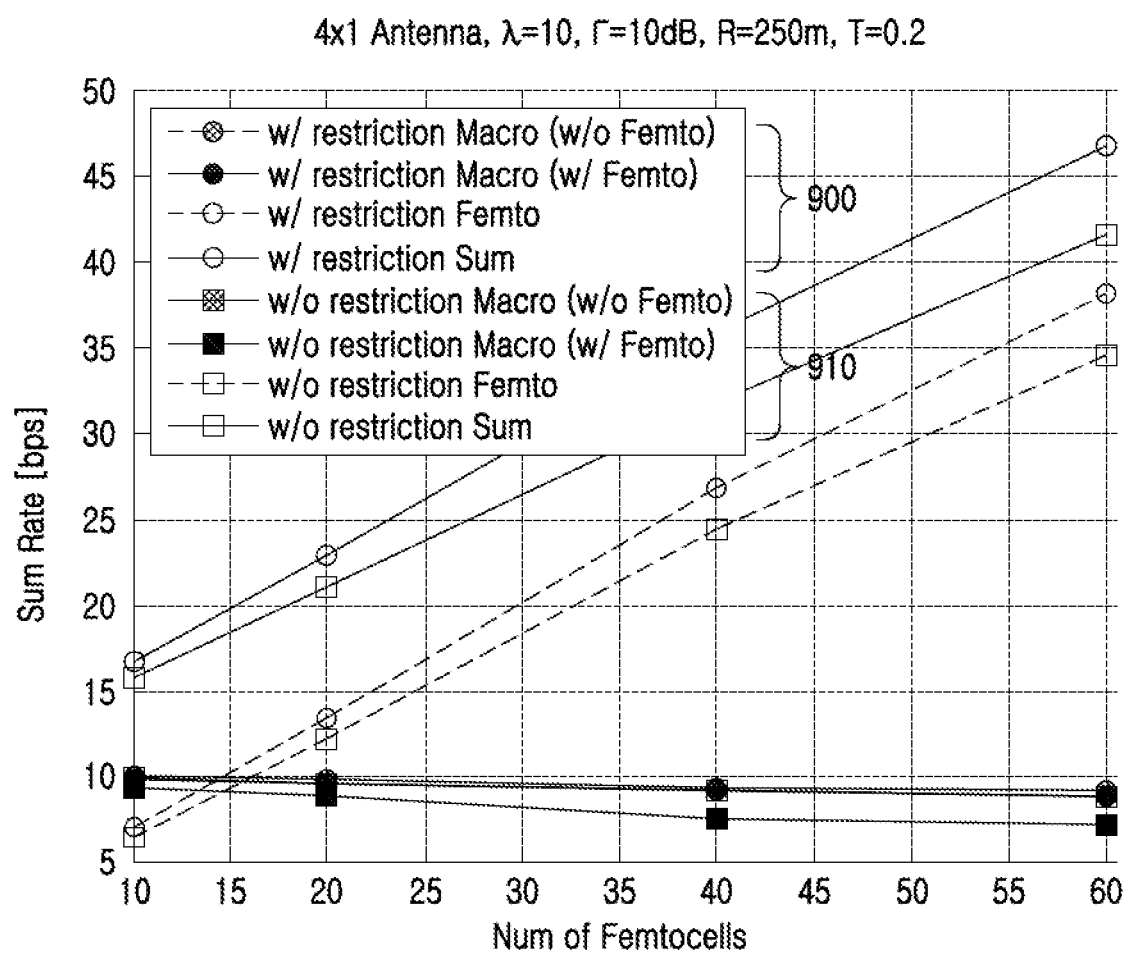
FIG. 9 is a graph illustrating a variation of a sum rate of a macro cell and femto cell dependent on a number of femto BSs according to an exemplary embodiment of the present invention.

FIG. 9 illustrates a variation of a sum rate of a macro cell and femto cell dependent on a number of femto BSs according to an exemplary embodiment of the present invention.

More specifically, FIG. 9 shows a comparison of a sum rate of a macro cell and femto cell between a first method 900 restricting a codebook set available by resource block and a second method 910 using the whole codebook at all resource blocks, when assuming that a threshold (T) amount of interference for a femto MS to select an available resource block is equal to '0.2'.

Referring to FIG. 9, in a case of the second method 910, as the number of femto cells increases, a sum rate of a macro cell is seriously deteriorated.

Unlike this, in a case of the first method 900, although the number of femto cells increases, a sum rate of a macro cell is not greatly deteriorated.

Figure 10:
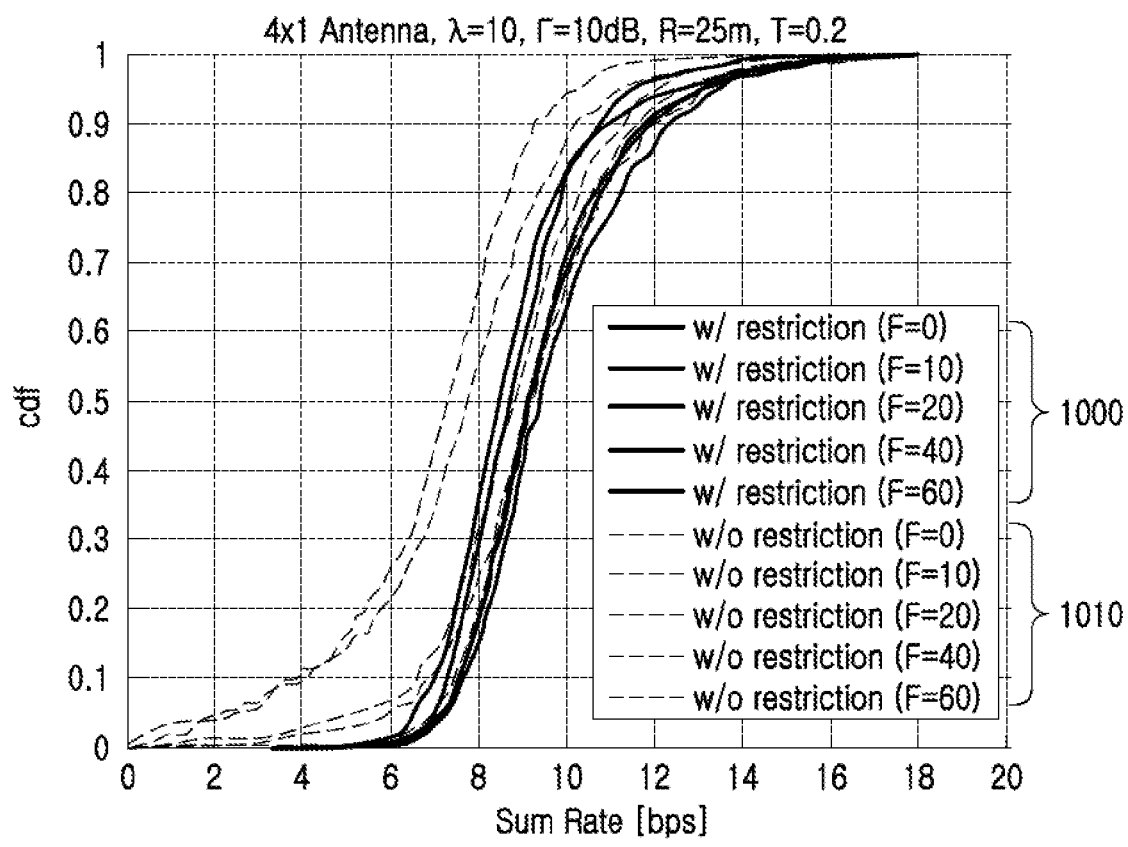
FIG. 10 is a graph illustrating a Cumulative Density Function (CDF) of a macro-cell sum rate dependent on a number of femto BSs according to an exemplary embodiment of the present invention.

FIG. 10 illustrates a Cumulative Density Function (CDF) of a macro-cell sum rate dependent on a number of femto BSs according to an exemplary embodiment of the present invention.

More specifically, FIG. 10 shows a comparison of a CDF for a macro-cell sum rate between a first method 1000 restricting a codebook set available by resource block and a second method 1010 using the whole codebook at all resource blocks, when assuming that a threshold (T) amount of interference for a femto MS to select an available resource block is equal to '0.2'.

Referring to FIG. 10, the first method 1000 improves a deterioration of a sum rate at low SINR more than the second method 1010. That is, the first method 1000 can improve performance of a femto MS having relatively low SINR, since the femto MS is positioned closely to a femto cell, more than the second method 1010.

In the aforementioned exemplary embodiment, it is assumed that a threshold (T) amount of interference for a femto MS to select an available resource block is equal to '0.2'. If there is a change of the threshold (T) amount of interference, a variation of performance according to an exemplary embodiment of the present invention is shown as illustrated in FIG. 11.

FIGS. 11A-11D illustrate a CDF of a macro-cell sum rate dependent on a threshold amount of interference according to exemplary embodiments of the present invention.

Figure 11A:
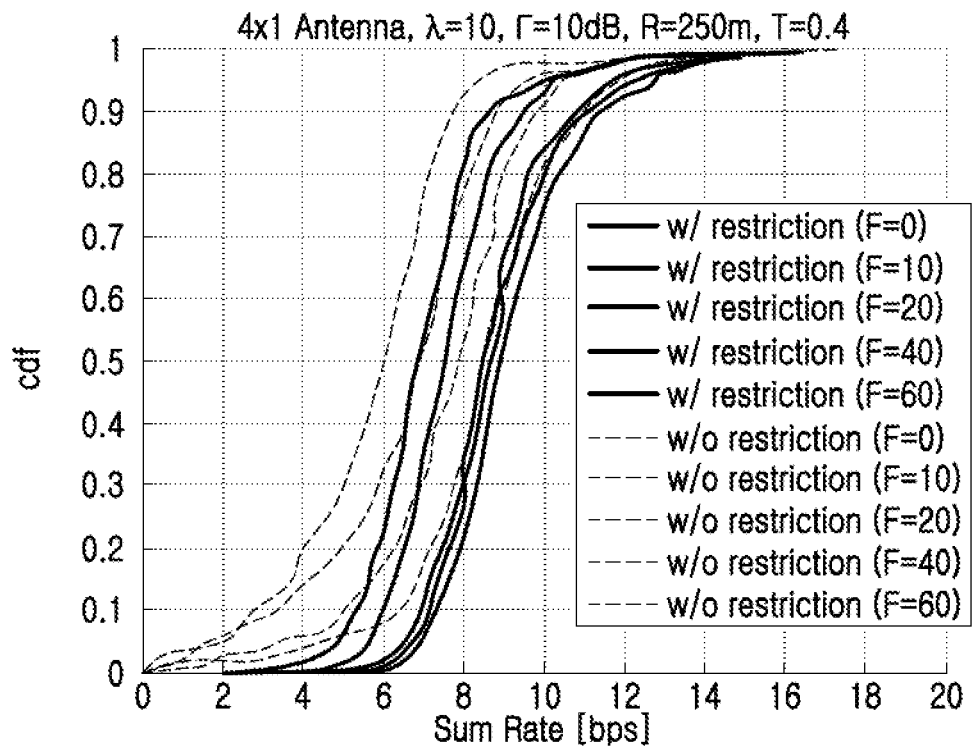
FIGS. 11A-11D are graphs illustrating a CDF of a macro-cell sum rate dependent on a threshold amount of interference according to exemplary embodiments of the present invention.
Figure 11B:
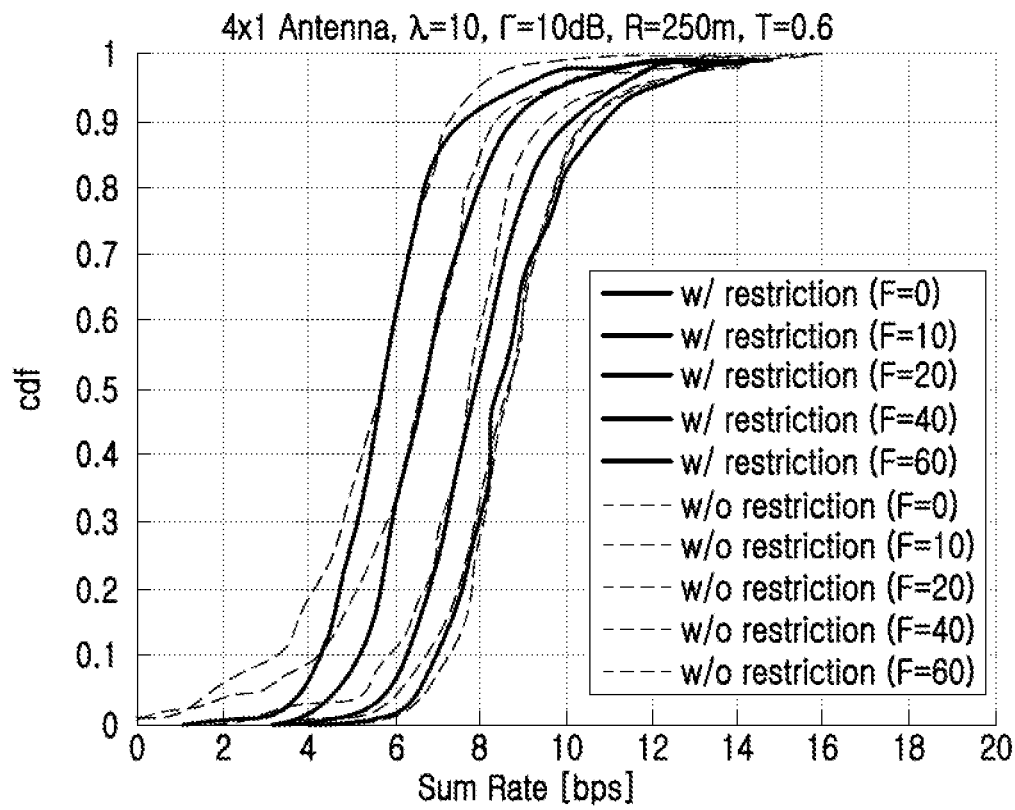
Figure 11C:
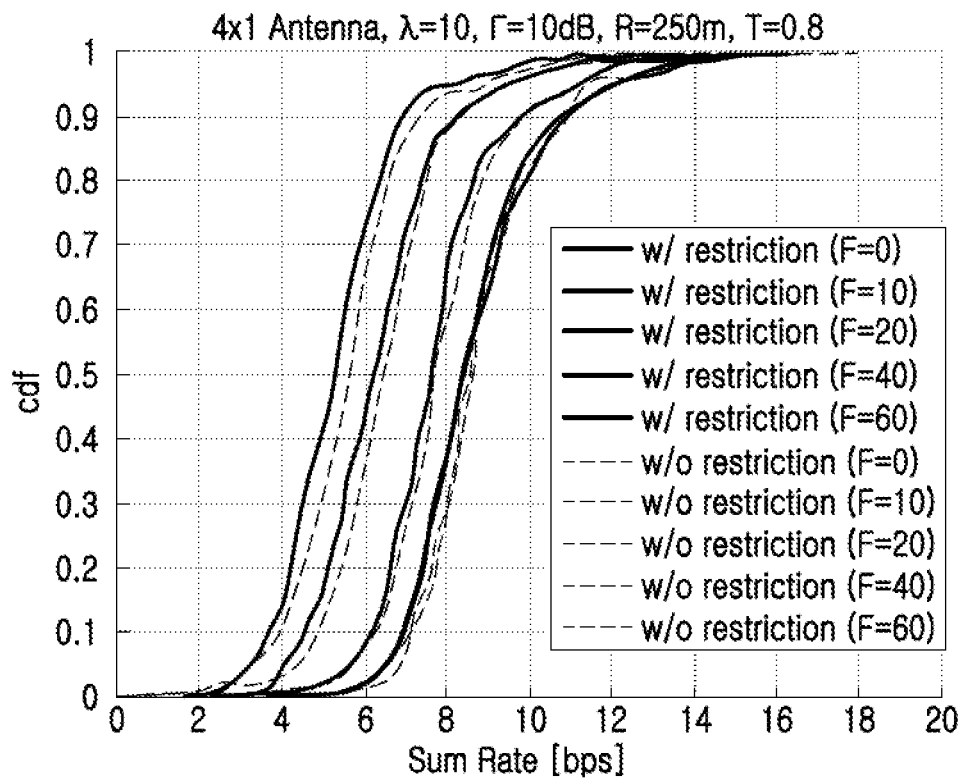
Figure 11D:
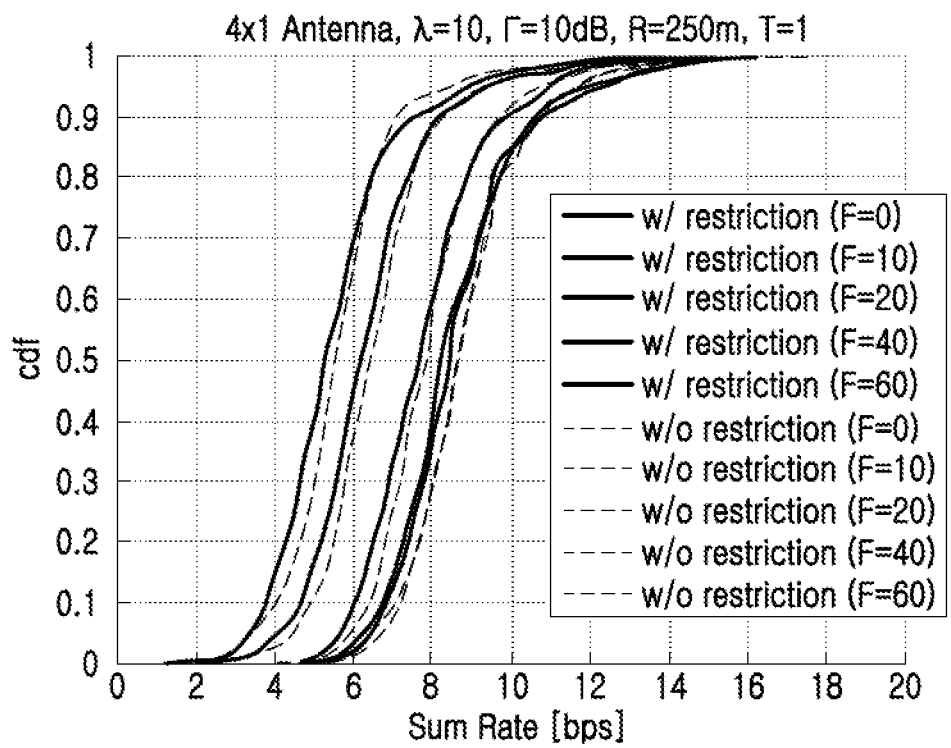

More specifically, FIG. 11A illustrates a CDF for a sum rate of a macro cell in a case where a threshold (T) amount of interference is set to '0.4'. FIG. 11B illustrates a CDF for a sum rate of the macro cell in a case where the threshold (T) amount of interference is set to '0.6'. FIG. 11C illustrates a CDF for a sum rate of the macro cell in a case where the threshold (T) amount of interference is set to '0.8'. FIG. 11D illustrates a CDF for a sum rate of the macro cell in a case where the threshold (T) amount of interference is set to '1'.

Referring to FIGS. 11A-11D, as the threshold (T) amount of interference is set low, a sum rate of a femto cell decreases and thus interference from the femto cell to the macro cell decreases. Thus, as the threshold (T) amount of interference is set low, a CDF for a sum rate of the macro cell is improved.

On the other hand, as the threshold (T) amount of interference is set high, the sum rate of the femto cell increases and thus interference from the femto cell to the macro cell increases. Thus, as the threshold (T) amount of interference is set high, a CDF for a sum rate of the macro cell is deteriorated.

In a case of using a codebook set restricted by resource block according to exemplary embodiments of the present invention as described above, a threshold (T) amount of interference for a femto MS to select an available resource block determines tradeoff for performance of a femto cell and macro cell.

As described above, an exemplary embodiment of the present invention restricts a codebook available for beamforming every resource block in a macro BS of a wireless communication system including a femto cell, thereby mitigating inter-cell interference with no information exchange through a backhaul between the macro BS and a femto BS. Also, a femto MS, in advance, predicts the maximum amount of interference from the macro BS, thus being capable of effectively predicting a resource block of less interference from the macro BS. Also, an exemplary embodiment of the present invention has an advantage in which the femto BS allocates a resource of a resource block of less interference from a macro BS to a femto MS, and uses a transmit power necessary for satisfying an SINR needed by the femto MS, thereby being capable of reducing interference from the femto BS to a macro MS.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for mitigating inter-cell interference in a Mobile Station (MS) receiving a service from a macro Base Station (BS) in a wireless communication system having at least one femto cell, the method comprising:
    determining a codebook set for each resource block, the codebook set being constructed by restricting at least one code among at least one available code when forming a beam by resource block in the macro BS;
    estimating a channel with the macro BS and a channel with at least one femto BS;
    estimating a Signal to Interference and Noise Ratio (SINR) for at least one code available by at least one resource block, in consideration of the channel with the macro BS and the channel with the at least one femto BS;
    determining a code capable of obtaining the maximum sum rate by at least one resource block, using the SINR; and
    feeding back the maximum sum rate for the at least one resource block and the determined code to the macro BS,
    wherein the at least one code available by resource block is comprised in the codebook set.

2. The method of claim 1, wherein the determining of the codebook set comprises determining a codebook set for each resource block, constructed by restricting at least one code among at least one available code when forming a beam, through a broadcast control message transmitted by the macro BS.

3. The method of claim 1, wherein the determining of the codebook set comprises:
    determining a codebook set construction pattern that the macro BS has used to construct a codebook set for each resource block, through identifier information of the macro BS; and generating a codebook set for each resource block, constructed by restricting at least one code among at least one available code when forming a beam, according to the codebook set construction pattern.

4. A method for mitigating inter-cell interference in a Mobile Station (MS) receiving a service from a femto Base Station (BS) in a wireless communication system having at least one femto cell, the method comprising:
determining a codebook set for each resource block, which is constructed by restricting at least one code among at least one available code when forming a beam by resource block in a macro BS;
calculating a correlation value of the at least one code available when forming the beam by resource block;
calculating the greatest amount of interference from the macro BS by resource block, based on the correlation value of the code;
determining at least one resource block available when receiving a service from the femto BS, based on the greatest amount of interference of the resource blocks; and
feeding back at least one available resource block information to the femto BS,
wherein the at least one code available when forming the beam by resource block is comprised in the codebook set.

5. The method of claim 4, wherein the determining of the codebook set comprises determining a codebook set for each resource block through a broadcast control message transmitted by the femto BS, the codebook set being constructed by restricting at least one code among at least one available code when forming a beam.

6. The method of claim 4, wherein the determining of the codebook set comprises:
determining a codebook set construction pattern that the macro BS has used to construct a codebook set for each resource block, through identifier information of the macro BS; and
generating a codebook set for each resource block, constructed by restricting at least one code among at least one available code when forming a beam, according to the codebook set construction pattern.

7. The method of claim 4, wherein the determining of the available at least one resource block comprises:
comparing the greatest amount of interference of the resource blocks with a threshold amount of interference; and
determining at least one resource block available when receiving a service from the femto BS, according to the comparison result.

8. The method of claim 4, wherein the feeding back comprises:
selecting at least one resource block for feedback among the determined available resource blocks in consideration of a resource allocation technique of the femto BS and a scheduling criterion; and
feeding back the selected at least one resource block to the femto BS.

9. An apparatus for mitigating inter-cell interference in a Mobile Station (MS) receiving a service from a macro Base Station (BS) in a wireless communication system having at least one femto cell, the apparatus comprising:
at least one antenna;
a codebook controller for determining a codebook set for each resource block, constructed by restricting at least one code among at least one available code when forming a beam by resource block in the macro BS;
a channel estimator for estimating a channel with the macro BS and a channel with at least one femto BS, using a signal received through the antenna;
a Signal to Interference and Noise Ratio (SINR) estimator for estimating an SINR for at least one code available by at least resource block, in consideration of the channel with the macro BS and the channel with the at least one femto BS; and
a feedback controller for feeding back a code, which is capable of obtaining the maximum sum rate by at least one resource block using the SINR and the maximum sum rate for the resource block, to the macro BS,
wherein the at least one code available by resource block is comprised in the codebook set.

10. The apparatus of claim 9, wherein the codebook controller determines a codebook set for each resource block, constructed by restricting at least one code among at least one available code when forming a beam, through a broadcast control message transmitted by the macro BS, and stores the determined codebook set for each resource block.

11. The apparatus of claim 9, wherein the codebook controller generates a codebook set for each resource block, constructed by restricting at least one code among at least one available code when forming a beam, according to a codebook set construction pattern that the macro BS has used to construct the codebook set for each resource block, determines the codebook set for each resource block through identifier information of the macro BS, and stores the generated codebook set for each resource block.

12. The apparatus of claim 9, further comprising:
at least one Radio Frequency (RF) processor for converting an RF signal received through each antenna into a baseband signal; and
at least one Orthogonal Frequency Division Multiplexing (OFDM) demodulator for converting a signal provided from each RF processor into a frequency domain signal through Fast Fourier Transform (FFT), and for outputting the frequency domain signal to the channel estimator and a Multiple Input Multiple Output (MIMO) detector.

13. An apparatus for mitigating inter-cell interference in a Mobile Station (MS) receiving a service from a femto Base Station (BS) in a wireless communication system having at least one femto cell, the apparatus comprising:
at least one antenna;
a receiver for receiving a signal through the antenna;
a codebook controller for determining a codebook set for each resource block, constructed by restricting at least one code among at least one available code when forming a beam by resource block in a macro BS;
an interference determiner for calculating the greatest amount of interference from the macro BS by resource block based on a correlation value of the at least one code available when forming the beam by resource block; and
a feedback controller for feeding back at least one piece of resource block information available when receiving a service from the femto BS, to the femto BS based on the greatest amount of interference of the resource blocks.

14. The apparatus of claim 13, wherein the codebook controller determines a codebook set for each resource block, constructed by restricting at least one code among at least one available code when forming a beam, through a broadcast control message transmitted by the femto BS, and stores the determined codebook set for each resource block.

15. The apparatus of claim 13, wherein the codebook controller generates a codebook set for each resource block, constructed by restricting at least one code among at least one available code when forming a beam, according to a codebook set construction pattern that the macro BS has used to construct the codebook set for each resource block, determines the codebook set for each resource block through identifier information of the macro BS, and stores the generated codebook set for each resource block.

16. The apparatus of claim 13, wherein the feedback controller compares the greatest amount of interference of the resource blocks with a threshold amount of interference and determines at least one resource block available when receiving a service from the femto BS.

17. The apparatus of claim 13, wherein the feedback controller selects at least one resource block for feedback among the determined available resource blocks in consideration of a resource allocation technique of the femto BS and a scheduling criterion, and feeds back the selected at least one resource block to the femto BS.

18. The apparatus of claim 13, wherein the receiver comprises:
- a Radio Frequency (RF) processor for converting an RF signal received through the antenna into a baseband signal;
- an Orthogonal Frequency Division Multiplexing (OFDM) demodulator for converting the signal provided from the RF processor into a frequency domain signal through Fast Fourier Transform (FFT);
- a demodulator for demodulating the signal provided from the OFDM demodulator, according to a corresponding modulation level; and
- a decoder for decoding the signal demodulated in the demodulator, according to a corresponding modulation level.

* * * * *